United States Patent
Li et al.

(10) Patent No.: US 12,300,816 B2
(45) Date of Patent: *May 13, 2025

(54) POSITIVE ELECTRODE ACTIVE MATERIAL, POSITIVE ELECTRODE PLATE, LITHIUM-ION SECONDARY BATTERY, AND APPARATUS

(71) Applicant: CONTEMPORARY AMPEREX TECHNOLOGY (HONG KONG) LIMITED, Hong Kong (CN)

(72) Inventors: Qifeng Li, Ningde (CN); Qilan Zhang, Ningde (CN); Na Liu, Ningde (CN)

(73) Assignee: Contemporary Amperex Technology (HONG KONG) Limited, Hong Kong (CN)

( * ) Notice: Subject to any disclaimer, the term of this patent is extended or adjusted under 35 U.S.C. 154(b) by 85 days.

This patent is subject to a terminal disclaimer.

(21) Appl. No.: 18/118,754

(22) Filed: Mar. 8, 2023

(65) Prior Publication Data

US 2023/0246184 A1    Aug. 3, 2023

Related U.S. Application Data

(63) Continuation of application No. 17/512,702, filed on Oct. 28, 2021, now Pat. No. 12,176,534, which is a
(Continued)

(30) Foreign Application Priority Data

Apr. 28, 2019    (CN) .......................... 201910350192.1

(51) Int. Cl.
*H01M 4/52*    (2010.01)
*H01M 4/04*    (2006.01)
(Continued)

(52) U.S. Cl.
CPC ......... *H01M 4/525* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

2005/0202316 A1* 9/2005 Hwang ................. H01M 4/505
                                                    429/219
2012/0176089 A1* 7/2012 Hwang ................. H01M 4/364
                                                    429/188

FOREIGN PATENT DOCUMENTS

CN    1431972 A    7/2003
CN    1218417 C    9/2005
(Continued)

OTHER PUBLICATIONS

The International search report for PCT Application No. PCT/CN2019/121545, dated Mar. 4, 2020, 6 pages.
(Continued)

*Primary Examiner* — Barbara L Gilliam
*Assistant Examiner* — Angela J Martin
(74) *Attorney, Agent, or Firm* — East IP P.C.

(57) ABSTRACT

The present application discloses a positive electrode active material, a positive electrode plate, a lithium-ion secondary battery, and an apparatus. The positive electrode active material satisfies a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $0.12 \leq b/c \leq 0.9$, $0.002 \leq b \times c/a^2 \leq 0.23$, $a+b+c=1$, $0 \leq d \leq 0.1$, and $0 \leq y < 0.2$; and an interval particle size distribution curve of the positive electrode active material has a full width at half maximum $D_{FW}$ of
(Continued)

from 4 μm to 8 μm. The positive electrode active material provided in the present application has relatively low cobalt content and relatively high cycle life and capacity performance.

19 Claims, 3 Drawing Sheets

Related U.S. Application Data continuation of application No. PCT/CN2019/121545, filed on Nov. 28, 2019.

(51) Int. Cl.
*H01M 4/13* (2010.01)
*H01M 4/131* (2010.01)
*H01M 4/525* (2010.01)
*H01M 10/05* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

FOREIGN PATENT DOCUMENTS

| | | | | |
|---|---|---|---|---|
| CN | 1667865 | A | 9/2005 | |
| CN | 101847722 | A | 9/2010 | |
| CN | 101947722 | * | 9/2010 | ............. Y02E 60/10 |
| CN | 102208642 | A | 10/2011 | |
| CN | 102952878 | A | 3/2013 | |
| CN | 103035913 | A | 4/2013 | |
| CN | 104507864 | A | 4/2015 | |
| CN | 105185980 | A | 12/2015 | |
| CN | 105453312 | A | 3/2016 | |
| CN | 105529457 | A | 4/2016 | |
| CN | 105977475 | * | 4/2016 | ............. H01M 4/525 |
| CN | 105594031 | A | 5/2016 | |
| CN | 105633395 | A | 6/2016 | |
| CN | 105932321 | * | 9/2016 | ........ H01M 10/0525 |
| CN | 105932321 | A | 9/2016 | |
| CN | 105977475 | A | 9/2016 | |
| CN | 105990577 | A | 10/2016 | |
| CN | 106935849 | A | 7/2017 | |
| CN | 107248576 | A | 10/2017 | |
| CN | 107572603 | A | 1/2018 | |
| CN | 108025926 | A | 5/2018 | |
| CN | 108539138 | A | 9/2018 | |
| CN | 109037614 | A | 12/2018 | |
| CN | 109216697 | A | 1/2019 | |
| CN | 109461928 | A | 3/2019 | |
| CN | 109599537 | A | 4/2019 | |
| CN | 109643795 | A | 4/2019 | |
| CN | 109686938 | A | 4/2019 | |
| JP | 2008235157 | A | 10/2008 | |
| JP | 2019021426 | * | 2/2019 | ............. Y02E 60/10 |
| WO | 2014175191 | A1 | 10/2014 | |
| WO | WO 2014175191 | * | 2/2017 | ............. C01G 53/00 |

OTHER PUBLICATIONS

The First Office Action for Chinese Application No. 201910350192.1, dated Jan. 21, 2020, 10 pages.
The Second Office Action for Chinese Application No. 201910350192.1, dated May 15, 2020, 6 pages.
Notification to Grant Patent Right for Invention for Chinese Application No. 201910350192.1, dated Sep. 25, 2020, 6 pages.
The First Office Action for Chinese division Application No. 202011340288.9, dated Jul. 27, 2021, 23 pages.
Notification to Grant Patent Right for Invention for Chinese division Application No. 202011340288.9, dated Jan. 24, 2022, 6 pages.
The extended European search report for EP Application No. 19926913.5, dated May 16, 2022, 4 pages.
The Non-Final Rejection for U.S. Appl. No. 17/512,702, dated Aug. 16, 2022, 19 pages.
The Non-Final Rejection for U.S. Appl. No. 17/512,702, dated Nov. 30, 2022, 11 pages.

* cited by examiner

POSITIVE ELECTRODE ACTIVE MATERIAL, POSITIVE ELECTRODE PLATE, LITHIUM-ION SECONDARY BATTERY, AND APPARATUS

CROSS-REFERENCE TO RELATED APPLICATION

This application is a continuation of U.S. patent application Ser. No. 17/512,702, filed on Oct. 28, 2021, which is a continuation of International Application No. PCT/CN2019/121545, filed on Nov. 28, 2019. The International Application claims priority to Chinese Patent Application No. 201910350192.1 filed on Apr. 28, 2019. The aforementioned patent applications are incorporated herein by reference in their entireties.

TECHNICAL FIELD

This application belongs to the technical field of batteries, and specifically relates to a positive electrode active material, a positive electrode plate, a lithium-ion secondary battery, and an apparatus.

BACKGROUND

Lithium-ion secondary batteries are a kind of rechargeable batteries, and mainly rely on the movement of lithium ions between a positive electrode and a negative electrode to work. As an important part of the lithium-ion secondary batteries, the positive electrode active material provides lithium ions that move back and forth between the positive and negative electrodes for charging and discharging of the batteries. Therefore, the positive electrode active material is very important to the performance of the batteries.

The nickel-cobalt-manganese ternary material has become a potential positive electrode active material for lithium-ion secondary batteries due to its unique advantages. The existing nickel-cobalt-manganese ternary material usually includes a relatively high content of cobalt, which can stabilize the structure of the material to meet the requirements for high cycle performance of secondary batteries. However, cobalt resource's reserves are scarce, so it is necessary to seek for a new nickel-cobalt-manganese ternary positive electrode active material with relatively low cobalt content but still high structural stability.

SUMMARY

It is found by the inventors that, cobalt can stabilize the layered structure of a nickel-cobalt-manganese ternary positive electrode active material and improve the electronic conductivity of the material, thus structural stability and electronic conductivity of the positive electrode active material deteriorate seriously after the cobalt content is reduced, which ultimately damages cycle performance of batteries. The reduction of the cobalt content also disadvantageously reduces the powder compaction density of the positive electrode active material, which also deteriorates cycle performance of the batteries and even leads to a relatively low energy density of the batteries.

The inventors have conducted a lot of research, aiming to enable the positive electrode active material to have low cobalt content and relatively high structural stability, electronic conductivity and powder compaction density, so as to obtain a lithium-ion secondary battery with relatively high cycle performance and energy density.

Therefore, a first aspect of the present application provides a positive electrode active material, satisfying a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $0.12 \leq b/c \leq 0.9$, $0.002 \leq b \times c/a^2 \leq 0.23$, $a+b+c=1$, $0 \leq d \leq 0.1$, $0 \leq y < 0.2$; and an interval particle size distribution curve of the positive electrode active material has a full width at half maximum $D_{FW}$ of from 4 µm to 8 µm.

A second aspect of the present application provides a positive electrode plate, including a positive electrode current collector and a positive electrode active material layer disposed on the positive electrode current collector, wherein the positive electrode active material layer includes the positive electrode active material provided in the first aspect of the present application.

A third aspect of the present application provides a lithium-ion secondary battery, including the positive electrode plate provided in the second aspect of the present application.

A fourth aspect of the present application provides an apparatus, including the lithium-ion secondary battery described in the third aspect of the present application, wherein the lithium-ion secondary battery is used as a power source for the apparatus; and preferably, the apparatus includes a mobile device, an electric vehicle, an electric train, a satellite, a ship, and an energy storage system.

The positive electrode active material provided by the present application satisfies the chemical formula $Li_{1+x}(Ni_aCo_bMn_c)_{1-d}M_dO_{2-y}A_y$, with relatively low cobalt content, which reduces the use of high-priced cobalt materials. It is surprisingly found by the inventors of the present invention that the proportion of elements in the positive electrode active material satisfying the predetermined relationship mentioned above also ensures that the positive electrode active material has both relatively high structural stability and relatively high lithium ion and electron transport performance, which enables the positive electrode active material to have relatively high cycle life, thereby improving the cycle performance of lithium-ion secondary battery using such positive electrode active material. In addition, the full width at half maximum $D_{FW}$ of the interval particle size distribution curve of the positive electrode active material within the predetermined range enables the positive electrode active material to have an appropriate powder compaction density, which can improve the plate compaction density of the positive electrode plate using such positive electrode active material, thereby further improving the cycle performance of the battery and enabling the battery to have a relatively high energy density.

The battery module, the battery pack, and the apparatus of the present application include the lithium-ion secondary battery, and thus have at least the same advantages as the lithium-ion secondary battery.

DESCRIPTION OF THE DRAWINGS

In order to explain the technical solutions of the embodiments of the present application more clearly, the following will briefly introduce the drawings that are used in the embodiments of the present application. Apparently, the drawings described below are only some embodiments of the present application. A person of ordinary skill in the art can obtain other drawings based on the drawings without creative work.

Figure 1:
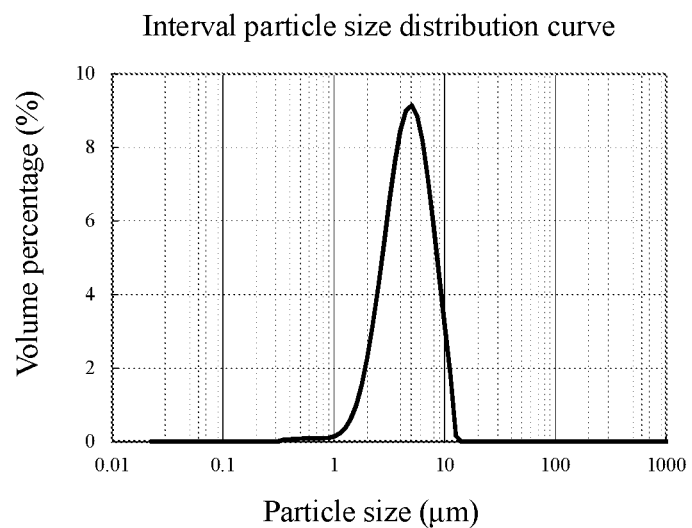
FIG. 1 is an interval particle size distribution curve graph of a positive electrode active material provided in Example 1.

In the figures:
1. Battery pack;
2. Upper box body;
3. Lower box body;
4. Battery module;
5. Lithium-ion secondary battery.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form an unspecified range; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Active Material

In order to reduce the use of high-priced cobalt materials in positive electrode active materials, and to ensure that the positive electrode active materials have relatively high electrochemical performance, an embodiment in the first aspect of the present application provides a positive electrode active material, satisfying a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $0.12 \leq b/c \leq 0.9$, $0.002 \leq b \times c/a^2 \leq 0.23$, $a+b+c=1$, $0 \leq d \leq 0.1$, $0 \leq y < 0.2$; and an interval particle size distribution curve of the positive electrode active material has a full width at half maximum $D_{FW}$ of from 4 μm to 8 μm.

The interval particle size distribution (also referred to as a differential distribution of particle size) curve of the positive electrode active material has a well-known meaning in the art. It is a curve drawn with the particle size as the abscissa and the volume percentage as the ordinate, and can relatively accurately reflect the particle size distribution characteristics of positive electrode active material particles. A laser particle size analyzer can be used for measuring the volume particle size distribution of the positive electrode active material and drawing the interval particle size distribution curve, for example, a Mastersizer 3000 laser particle size analyzer manufactured by Malvern Instruments Co., Ltd., UK.

The full width at half maximum $D_{FW}$ herein refers to a difference between two particle size values corresponding to half of the maximum height of the interval particle size distribution curve.

The positive electrode active material provided in the present application satisfies the chemical formula $Li_{1+x}(Ni_aCo_bMn_c)_{1-d}M_dO_{2-y}A_y$, indicating that the cobalt content in the positive electrode active material is relatively low, which reduces the use of high-priced cobalt materials. It is surprisingly found by the inventors of the present invention that the proportion of elements in the positive electrode active material satisfying the above-mentioned predetermined relationship can reduce disordered arrangement between lithium ions and transition metal ions and improve the order degree of positive ions in the layered structure, thereby ensuring that the positive electrode active material has relatively high structural stability. Therefore, the positive electrode active material has a relatively high cycle life and can improve the cycle performance of lithium-ion secondary batteries. It is also found by the inventors that satisfying the above chemical formula also ensures that lithium ions and electrons have relatively high transport performance in the positive electrode active material particles, thereby further improving the cycle performance of batteries.

The positive electrode active material has relatively high lithium ion and electron transport performance, can also improve the capacity performance of batteries, and enables the batteries to obtain relatively high rate performance and power performance.

Based on further researches and, it is found by the inventors that the full width at half maximum $D_{FW}$ of the interval particle size distribution curve of the positive electrode active material within a predetermined range can improve the powder compaction density of the positive electrode active material, and ensure that the positive electrode plate using the positive electrode active material has an appropriate plate compaction density, thereby further improving the cycle performance of batteries and enabling the batteries to have a relatively high energy density.

The positive electrode active material satisfying the chemical formula $Li_{1+x}(Ni_aCo_bMn_c)_{1-d}M_dO_{2-y}A_y$ also indicates a relatively high nickel content therein, where $a \geq 0.5$. The positive electrode active material has a relatively high capacity per gram, which can improve the capacity performance and increase energy density of batteries.

Therefore, the positive electrode active material of the present application enables the lithium-ion secondary battery to have both good cycle performance and relatively high energy density. In addition, the lithium-ion secondary battery also has relatively high rate performance and power performance.

The "cycle performance" mentioned in this specification includes normal temperature cycle performance and high temperature cycle performance. The high temperature as mentioned above is, for example, 40° C. or more, or 60° C. or more.

In some embodiments, the full width at half maximum $D_{FW}$ of the interval particle size distribution curve of the positive electrode active material may be 8 μm or less, 7.8 μm or less, 7.5 μm or less, 7.2 μm or less, 7 μm or less, 6.8 μm or less, 6.5 μm or less, 6.3 μm or less, or 6 μm or less, and may be 4 μm or more, 4.2 μm or more, 4.5 μm or more, 4.7 μm or more, 5 μm or more, 5.3 μm or more, 5.5 μm or more, 5.7 μm or more, or 5.8 μm or more.

Preferably, the interval particle size distribution curve of the positive electrode active material has a full width at half maximum $D_{FW}$ of from 4.5 μm to 7.5 μm, and more preferably from 5 μm to 7 μm. This can further increase the powder compaction density of the positive electrode active material, thereby further increasing the plate compaction density of the positive electrode plate and further increasing the energy density of the battery.

In some preferred embodiments, the interval particle size distribution curve of the positive electrode active material is a unimodal curve.

In some preferred embodiments, in the chemical formula, 0.5≤a≤0.7, and 0<b≤0.2.

In some embodiments, 0<d≤0.1. By doping the positive electrode active material with an M element, the structure of the positive electrode active material can be further stabilized, and the transport performance of lithium ions in the positive electrode active material particles can be improved, so that the cycle performance of the battery can be further improved.

In addition, the doping of the M element in the positive electrode active material can further increase the crystal face activation energy of primary particles with low cobalt content and improve the crystal structure, which is conducive to optimizing the particle size and size distribution and improving the transport performance of electrons and lithium ions in the positive electrode active material, thereby further improving the cycle performance, rate performance, power performance and energy density of the lithium-ion secondary battery.

In some embodiments, preferably, M is one or more selected from Zr, Sr, B, Ti, Mg and Al. More preferably, M is one or more selected from Zr, Sr, B, Ti and Al. Especially preferably, M is one or more selected from Zr, Sr and B.

In some embodiments, 0<y<0.2. By doping the A element with relatively strong electronegativity in the positive electrode active material, the structural stability of the positive electrode active material can be further improved, thereby increasing the cycle life of the positive electrode active material, which is conducive to improving the cycle performance of the battery.

In some embodiments, preferably, A is one or more selected from S, N and F.

In some embodiments, the positive electrode active material according to the embodiment of the present application may include, for example, $LiNi_{0.55}Co_{0.05}Mn_{0.4}O_2$, $LiNi_{0.55}Co_{0.1}Mn_{0.35}O_2$, $LiNi_{0.55}Co_{0.12}Mn_{0.33}O_2$, $LiNi_{0.55}Co_{0.1}Mn_{0.3}O_2$, $LiNi_{0.6}Co_{0.15}Mn_{0.2502}$, $LiNi_{0.6}Co_{0.18}Mn_{0.22}O_2$, $LiNi_{0.65}Co_{0.05}Mn_{0.3}O_2$, $LiNi_{0.65}Co_{0.09}Mn_{0.26}O_2$, $LiNi_{0.5}Co_{0.12}Mn_{0.23}O_2$, and $LiNi_{0.65}Co_{0.15}Mn_{0.2}O_2$, and may also be a positive electrode active material obtained after doping the above materials with the M element at the transition metal site, and/or doping the above materials with the A element at the oxygen site.

In some embodiments, the positive electrode active material has a particle size distribution $D_n10$ and a particle size distribution $D_v50$ preferably satisfying: $D_n10≥0.2$ μm, and 2 μm≤$D_v50$≤7 μm. This ensures that the positive electrode active material has a relatively low content of fine particles, and can reduce the side reaction of an electrolyte on the surface of the positive electrode active material, inhibit gas production and reduce heat generation, thereby improving cycle performance and safety performance of the positive electrode active material and improving electrochemical performance of the positive electrode active material at a high temperature. The high temperature is, for example, 40° C. or more, or 60° C. or more.

The reduction of the content of fine particles in the positive electrode active material is also conducive to lowering the interface resistance of the positive electrode active material, and inhibiting the agglomeration between material particles, thereby improving the rate performance and power performance of the battery. The positive electrode active material has a uniform particle distribution, and can have a relatively high powder compaction density, so that the positive electrode plate has a more uniform areal density and a higher compaction density, which can further improve the capacity performance and energy density of the lithium-ion secondary battery.

In addition, the particle size distribution $D_n10$ and the particle size distribution $D_v50$ of the positive electrode active material within the above ranges can further improve the transport performance of lithium ions and electrons in the positive electrode active material particles, and reduce polarization of the battery, thereby improving the cycle performance, rate performance and power performance of the lithium-ion secondary battery.

In some preferred embodiments, the particle size distributions of the positive electrode active material are preferably $D_n10≥1$ μm, and 3 μm≤$D_v50$≤6 μm. This can better exert the above effects.

In some preferred embodiments, the full width at half maximum $D_{FW}$ of the interval particle size distribution curve of the positive electrode active material and a particle size distribution $D_v99$ and a particle size distribution $D_v10$ of the positive electrode active material satisfy: $0.4≤D_{FW}/(D_v99−D_v10)≤1.2$. The particle size distributions of the positive electrode active material satisfying the above relationship means that the particle size distributions of the positive electrode active material tend to be a normal distribution, the positive electrode active material contains a relatively low amount of fine particles and relatively large particles, and the particle size distributions of the particles are within preferred ranges. This can further improve the compaction density, capacity performance and power performance of the positive electrode active material, thereby further improving the cycle performance, rate performance, power performance and energy density of the lithium-ion secondary battery.

In some optional embodiments, $0.5≤D_{FW}/(D_v99−D_v10)≤1.0$.

In some embodiments, the particle size distribution $D_v99$ and the particle size distribution $D_v10$ of the positive electrode active material satisfy: 7 μm≤$D_v99$≤15 μm, and 1 μm≤$D_v10$≤4 μm. Optionally, 8 μm≤$D_v99$≤13 μm, and 1.5 μm≤$D_v10$≤2.5 μm.

In some embodiments, the positive electrode active material has a specific surface area of preferably from 0.1 m$^2$/g to 1.2 m$^2$/g, and more preferably from 0.3 m$^2$/g to 0.9 m$^2$/g. The specific surface area of the positive electrode active material within the appropriate range enables the positive electrode active material to have both relatively high active specific surface area and relatively low oxidation activity of electrolyte on its surface, thereby increasing the capacity and cycle life of the positive electrode active material.

In some embodiments, the positive electrode active material includes dispersed primary particles. The dispersed primary particles indicate that these primary particles are separated and independent from each other, will not be agglomerated, and/or are composed of only 5 or less primary particles. Generally, these primary particles have a smooth surface morphology, fewer surface heteroatoms and functional groups, a relatively good crystal structure and a relatively high crystallinity. This can improve the transport performance of lithium ions and electrons in the positive electrode active material, reduce the side reaction of the electrolyte on particle surfaces, and increase the compaction density of the positive electrode active material, thereby improving the cycle performance, rate performance, power performance and energy density of battery.

The dispersed primary particles have a number percentage of preferably 50% or more, 60% or more, or 70% or more in the positive electrode active material. This means that the positive electrode active material has relatively high structural stability during the charging and discharging cycle, and is unlikely to break, thereby improving the cycle performance of battery.

In some embodiments, in the positive electrode active material, the dispersed primary particles have a monodisperse particle size distribution. The term "monodisperse" represents a dispersion system in which the dispersed primary particles has a unimodal particle size distribution and most of particles have similar or equal particle sizes, and the particle size distribution is a normal distribution. Optionally, the dispersed primary particles have a number percentage of 100% in the positive electrode active material, that is, all of particles of the positive electrode active material are the dispersed primary particles with a monodisperse particle size distribution.

In some embodiments, the positive electrode active material further includes secondary particles aggregated from a plurality of primary particles. The term "a plurality of" is, for example, 5 or more. That is, the positive electrode active material may be a mixed powder including dispersed primary particles and secondary particles. The positive electrode active material has better lithium ion and electron transport performance, which is conducive to the intercalation and deintercalation of lithium ions and electron migration, and the capacity performance of the positive electrode active material is improved, thereby increasing the energy density of lithium-ion secondary battery.

The secondary particles have a number percentage of preferably from 5% to 50%, further from 10% to 30% in the positive electrode active material. This is conducive to improving the cycle performance, rate performance, power performance and energy density of battery.

In some embodiments, a ratio of particle sizes of the primary particles in the secondary particles to the secondary particles is preferably from 0.03 to 0.9, from 0.06 to 0.5, or from 0.1 to 0.35. Among the secondary particles, the primary particles have a relatively good morphology, are less agglomerated, and have a relatively good crystal form and a relatively high crystallinity, which are beneficial to improving the cycle performance, rate performance and power performance of the positive electrode active material. In addition, the positive electrode active material can also achieve relatively high capacity performance, thereby increasing the energy density of battery.

In some embodiments, the positive electrode active material has a tap density of preferably from 1.6 g/cm$^3$ to 2.6 g/cm$^3$. The positive electrode plate using the positive electrode active material can obtain a relatively high plate compaction density.

In some embodiments, the positive electrode active material has a compaction density of preferably from 3.0 g/cm$^3$ to 3.6 g/cm$^3$, further from 3.1 g/cm$^3$ to 3.6 g/cm$^3$ under a pressure of 3 tons. The positive electrode active material has a relatively high compaction density, which can increase the plate compaction density of the positive electrode plate, so that the lithium-ion secondary battery has relatively high capacity performance and energy density.

In some embodiments, a surface of the positive electrode active material has a coating. The coating is preferably a coating including an X element oxide. The X element oxide is an inert oxide. Preferably, the X element is one or more selected from trivalent elements and tetravalent elements.

The surface of the positive electrode active material has a coating, which can further stabilize the structure of the positive electrode active material, reduce the oxidation activity of electrolyte on the surface of the material, reduce the side reaction of the electrolyte on the surface of the material, inhibit gas production, and reduce heat production, thereby improving the cycle performance and safety performance of battery.

In some embodiments, the X element preferably includes one or more of Zr, B, Ti, Al and Sn.

The coating has a weight of from 0.01% to 1%, or from 0.03% to 1%, relative to a weight of the positive electrode active material before coating. This can ensure that the above good effects of the coating, and meanwhile ensure that the coated positive electrode active material has relatively high rate performance, power performance and capacity performance.

In some optional embodiments, the morphology of the positive electrode active material is one or more of spherical and quasi-spherical shapes. This is beneficial to enabling the positive electrode active material to obtain a relatively high compaction density, thereby increasing the energy density of the battery.

The particle size distributions $D_n10$, $D_v50$, $D_v99$ and $D_v10$ of positive electrode active material all have well-known meanings in the art, wherein the particle size distribution $D_n10$ represents a particle size corresponding to 10% of the number distribution of the positive electrode active material particles; the particle size distribution $D_v50$, also referred to as an average particle size or a median particle size, represents a particle size corresponding to 50% of the volume distribution of the positive electrode active material particles; the particle size distribution $D_v99$ represents a particle size corresponding to 99% of the volume distribution of the positive electrode active material particles; the particle size distribution $D_v10$ represents a particle size corresponding to 10% of the volume distribution of the positive electrode active material particles. The particle size distributions can be measured by instruments and methods well-known in the art. For example, the particle size distributions may be conveniently measured with a laser particle size analyzer, such as Mastersizer 3000 laser particle size analyzer of Malvern Instruments Co., Ltd., UK.

The number percentages of the dispersed primary particles and the secondary particles in the positive electrode active material have well-known meanings in the art, and can be measured by instruments and methods known in the art, such as a scanning electron microscope (SEM). For example, a method for testing the number percentage of the dispersed primary particles is: taking at least 10 SEM photos of different regions of a powder sample of positive electrode active material, counting the number of the dispersed primary particles and the number of overall positive electrode active material particles respectively, and calculating an average value, thus obtaining the number percentage of the dispersed primary particles in the positive electrode active material. Similarly, the number percentage of the secondary particles in the positive electrode active material can also be tested.

The specific surface area of the positive electrode active material has a well-known meaning in the art, and can be measured by instruments and methods known in the art. For example, the specific surface area may be tested by nitrogen adsorption specific surface area analysis test and calculated by a BET (Brunauer Emmett Teller) method. The nitrogen adsorption specific surface area analysis test may be performed by Tri Star II specific surface and pore analyzer of Micromeritics, USA.

The tap density of the positive electrode active material can be measured by instruments and methods known in the art, for example, it may be conveniently measured by a tap density tester, such as FZS4-4B type tap density tester.

The compaction density of the positive electrode active material can be measured by instruments and methods known in the art, for example, it may be conveniently measured by an electronic pressure tester, such as UTM7305 electronic pressure tester.

Next, a method for preparing a positive electrode active material is provided, by which the above-mentioned positive electrode active material can be prepared. The method comprises:

S100, mixing a positive electrode active material precursor, a lithium source, and an optional M source and/or A source and sintering to obtain a sintered product.

S200, crushing and sieving the sintered product to obtain an active material precursor.

S300, tempering and sieving the active material precursor to obtain the positive electrode active material.

In step S100, the positive electrode active material precursor and the lithium source may be mixed and sintered to obtain active material particles that do not include doping elements. Alternatively, the positive electrode active material precursor, the lithium source, and the M source and/or A source may be mixed and sintered to obtain active material particles that include doping elements M and/or A.

The positive electrode active material precursor may be one or more of oxides or hydroxides containing Ni, Co and Mn at a stoichiometric ratio, such as $[Ni_aCo_bMn_c](OH)_2$.

The positive electrode active material precursor may be prepared by a co-precipitation method, a gel method or a solid phase method. As an example, a method for preparing the positive electrode active material precursor includes the following steps:

S110, dispersing a Ni source, a Co source and a Mn source in a solvent at a stoichiometric ratio to obtain a mixed solution.

S120, adjusting pH value of the mixed solution, reacting at a preset temperature under stirring and preferably under protection by introducing an inert gas, and after the reaction is completed, carrying out separation, washing, and drying to obtain the positive electrode active material precursor.

In step S110, in some embodiments, the Ni source is selected from a soluble nickel salt. There is no special restriction on the specific type of the nickel salt, and it can be selected according to actual needs. As an example, the nickel salt may be one or more selected from nickel sulfate, nickel nitrate, nickel chloride, nickel oxalate, and nickel acetate, for example, one or more selected from nickel sulfate and nickel nitrate, such as nickel sulfate.

In some embodiments, the Co source is selected from a soluble cobalt salt. There is no special restriction on the specific type of the cobalt salt, and it can be selected according to actual needs. As an example, the cobalt salt may be one or more selected from cobalt sulfate, cobalt nitrate, cobalt chloride, cobalt oxalate and cobalt acetate, for example, one or more selected from cobalt sulfate and cobalt nitrate, such as cobalt sulfate.

In some embodiments, the Mn source is selected from a soluble manganese salt. There is no special restriction on the specific type of the manganese salt, and it can be selected according to actual needs. As an example, the manganese salt may be one or more selected from manganese sulfate, manganese nitrate, manganese chloride, manganese oxalate and manganese acetate, for example, one or more selected from manganese sulfate and manganese nitrate, such as manganese sulfate.

There is no special restriction on the solvent, as long as it can dissolve the Ni source, the Co source and the Mn source. As an example, the solvent may be one or more selected from water, methanol, ethanol, acetone, isopropanol and n-hexanol, wherein the water may include one or more of deionized water, distilled water, mineral water and tap water, such as deionized water.

There is no special restriction on the concentration of the mixed solution, and it can be adjusted according to actual needs. As an example, the mixed solution has a concentration of from 1.5 mol/L to 3.5 mol/L, for example, from 2.0 mol/L to 2.9 mol/L.

In some embodiments, in step S120, the pH value of the mixed solution may be adjusted to from 10 to 12. By adding a precipitant and a complexing agent to the mixed solution, the reaction system can be formed by adding a precipitant and a complexing agent to the mixed solution, the concentration of the complexing agent and the concentration of the precipitant in the reaction system may be adjusted, and the pH value of the reaction system may be adjusted to from 10 to 12 for co-precipitation reaction, thus obtaining the positive electrode active material precursor, such as $[Ni_aCo_bMn_c](OH)_2$.

In some embodiments, the precipitant may be one or more selected from LiOH, NaOH and KOH, such as NaOH. Further, the precipitant may be in the form of a solution. Solvent in the solution may be one or more selected from water, methanol, ethanol, acetone, isopropanol and n-hexanol. The mentioned water may include one or more of deionized water, distilled water, mineral water and tap water, such as deionized water. There is no special restriction on the concentration of the precipitant solution, and it can be determined according to actual needs.

In some embodiments, the complexing agent may be one or more selected from ammonia water, ammonium sulfate, ammonium nitrate, ammonium chloride, ammonium citrate, and ethylenediamine tetraacetic acid disodium salt (EDTA). Further, the complexing agent may be in the form of a solution. Solvent in the solution may be one or more selected from water, methanol, ethanol, acetone, isopropanol and n-hexanol. The mentioned water may include one or more of deionized water, distilled water, mineral water and tap water, such as deionized water.

Optionally, the complexing agent is ammonia water. There is no special restriction on the concentration of the ammonia water, and it can be selected according to actual needs. Optionally, the ammonia water has a concentration of from 0.1 mol/L to 2 mol/L, further from 0.3 mol/L to 1.5 mol/L, and still further from 0.5 mol/L to 1 mol/L.

In some embodiments, the reaction temperature in step S120 may be from 40° C. to 70° C., further from 45° C. to 65° C., and still further from 50° C. to 60° C.

In some embodiments, in step S120, the reaction is carried out under an inert gas protective atmosphere with continuous stirring. The inert gas is, for example, one or more selected from nitrogen, argon, and helium. There is no special restriction on the way of stirring, as long as the reaction system can be stirred uniformly. For example, mechanical stirring is chosen. The stirring speed is, for example, from 100 rpm to 800 rpm. The term "rpm" means revolutions per minute, representing number of revolutions of a stirring device per minute.

In some embodiments, when the co-precipitation reaction product is washed, there is no special restriction on washing agent, and it can be selected according to actual needs. For example, deionized water is used for washing. The number of washing times is not specially limited, as long as residual ions on the surface of the reaction product can be washed away.

In some embodiments, when the co-precipitation reaction product is dried after washing, the temperature and method of drying are not specially limited, and can be selected according to actual needs. For example, the temperature of drying is from 100° C. to 150° C.

In some embodiments, in step S100, the lithium source may be one or more selected from lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$) and lithium nitrate ($LiNO_3$). Further, the lithium source is one or more selected from lithium carbonate, lithium hydroxide and lithium nitrate. Furthermore, the lithium source is lithium carbonate.

In some embodiments, the M source may be one or more selected from oxides, nitrate compounds, carbonate compounds, hydroxides, and acetate compounds containing M element. The M source is selected from, for example, oxides containing M element. For example, the M source is one or more selected from magnesium oxide, strontium oxide, titanium oxide, tin oxide, zirconium oxide, aluminum oxide and boron oxide; for example, one or more selected from magnesium oxide, strontium oxide, titanium oxide, zirconium oxide, aluminum oxide and boron oxide; for another example, one or more selected from strontium oxide, titanium oxide, zirconium oxide, aluminum oxide and boron oxide; for still another example, one or more selected from zirconium oxide, strontium oxide and boron oxide.

The A source may be selected according to actual needs. In some embodiments, the A source may be one or more selected from ammonium fluoride, lithium fluoride, hydrogen fluoride, ammonium chloride, lithium chloride, hydrogen chloride, ammonium bromide, lithium bromide, hydrogen bromide, ammonium iodide, lithium iodide, hydrogen iodide, hydrogen sulfide, lithium sulfide and ammonium sulfide.

In some embodiments, optionally, when the active material particles that do not comprise doping elements or comprise doping elements are prepared, the positive electrode active material precursor and the lithium source are added in an amount such that a ratio of a total molar weight of metal elements in the positive electrode active material precursor to a molar weight of the Li element in the lithium source is Me:Li=1:(from 0.99 to 1.2), further Me:Li=1:(from 1 to 1.2), and furthermore, Me:Li=1:(from 1.05 to 1.15), where Me is a sum of the metal elements in the positive electrode active material precursor, that is, Me=Ni+Co+Mn.

In some embodiments, optionally, when the active material particles comprising the doping element M are prepared, the positive electrode active material precursor, the lithium source and the M source are added in an amount such that a ratio of a total molar weight of metal elements in the positive electrode active material precursor and the M element in the M source to a molar weight of the Li element in the lithium source is (Me+M):Li=1:(1+x), where Me+M=Ni+Co+Mn+M. The amount of the M source added is, for example, from 0.03% to 1.5% of the total weight of the positive electrode active material precursor and the lithium source before the addition.

In some embodiments, in step S100, the atmosphere for sintering is an oxygen-containing atmosphere, for example, an air atmosphere or an oxygen atmosphere. The sintering temperature may be from 820° C. to 1000° C., further from 850° C. to 1000° C., and still further from 900° C. to 1000° C. There is no special restriction on sintering time, which can be adjusted according to the actual situation, for example, from 5 h to 15 h.

In some embodiments, in step S200, the way of crushing is not particularly limited, and can be selected according to actual needs, for example, using a particle crusher. Through the crushing and sieving process of step S200, the finally obtained positive electrode active material can have the particle size distribution described above.

Optionally, the active material precursor has an average particle size $D_v50$ of from 3 μm to 6 μm, for example, from 4 μm to 6 μm.

In some embodiments, in step S300, the tempering temperature may be from 400° C. to 900° C., for example, from 400° C. to 800° C., further from 400° C. to 700° C., still further from 450° C. to 600° C., and furthermore from 500° C. to 600° C.

In some embodiments, after step S200 and before step S300, the method further includes step S400 of coating the active material precursor with an X element oxide.

The positive electrode active material obtained in these embodiments has a coating comprising an X element oxide on its surface.

In step S400, the X element oxide may be one or more selected from aluminum oxide, tin oxide, zirconium oxide, boron oxide and titanium oxide. The adding amount of the X element oxide is, for example, from 0.01% to 1%, or from 0.03% to 1% of the weight of the material before coating.

The coating can be carried out by using methods and devices known in the art, such as dry coating, liquid coating method, or vapor deposition coating.

The positive electrode active material provided by the embodiments of the present application is easy to prepare, easy to implement, and low in cost, and can be applied to industrial production on a large scale.

Positive Electrode Plate

The second aspect of the present application provides a positive electrode plate. The positive electrode plate comprises any one or more of the positive electrode active materials according to the first aspect of the present application.

By using the positive electrode plate of the present application adopts the positive electrode active material according to the first aspect of the present application, the positive electrode plate can simultaneously have good cycle performance, rate performance and power performance, and relatively high energy density.

As a specific example, the positive electrode plate comprises a positive electrode current collector and a positive electrode active material layer disposed on at least one surface of the positive electrode current collector. For example, the positive electrode current collector has two opposite surfaces in its thickness direction, and the positive electrode active material layer is laminated on either or both of the two surfaces of the positive electrode current collector. The positive electrode active material layer includes any one or more of the positive electrode active materials according to the first aspect of the present application.

In some embodiments, the positive electrode active material layer may further comprise a conductive agent and/or a binder. In the application, there is no specific limit on the types of the conductive agent and the binder in the positive electrode active material layer, which may be selected according to actual needs.

As an example, the conductive agent is one or more selected from graphite, superconducting carbon, acetylene black, carbon black, Ketjen black, carbon dots, carbon nanotubes, graphene, and carbon nanofibers.

As an example, the binder is one or more selected from styrene-butadiene rubber (SBR), water-based acrylic resin, sodium carboxymethyl cellulose (CMC), polyvinylidene fluoride (PVDF), polytetrafluoroethylene (PTFE), polyvinyl butyral (PVB), ethylene-vinyl acetate copolymer (EVA), and polyvinyl alcohol (PVA).

The positive electrode current collector may be a metal foil or a porous metal plate, and its material may be one or more of aluminum, copper, nickel, titanium, silver, and respective alloys thereof. The positive electrode current collector is, for example, an aluminum foil.

The positive electrode plate may be prepared according to conventional methods in the art. For example, a positive electrode active material, a conductive agent and a binder are dispersed in a solvent which may be N-methyl pyrrolidone (NMP) to form a uniform positive electrode slurry, the positive electrode slurry is applied on a positive electrode current collector, followed by the process including drying, rolling etc., a positive electrode plate is obtained.

Lithium-Ion Secondary Battery

The third aspect of the present application provides a lithium-ion secondary battery. The lithium-ion battery comprises a positive electrode plate, a negative electrode plate, a separator and an electrolyte, wherein the positive electrode plate is the one according to the second aspect of the present application.

By using the positive electrode plate according to the second aspect of the present application, which comprises the positive electrode active material according to the first aspect of the present application, the lithium-ion secondary battery of the present application can simultaneously have good cycle performance, rate performance and power performance, and relatively high energy density.

In some embodiments, the negative electrode plate may be a metal lithium plate.

In some embodiments, the negative electrode plate may further include a negative electrode current collector and a negative electrode active material layer disposed on at least one surface of the negative electrode current collector. For example, the negative electrode current collector has two opposite surfaces in its thickness direction, and the negative electrode active material layer is laminated on either or both of the two surfaces of the negative electrode current collector.

The negative electrode active material layer includes a negative electrode active material. In this application, there is no specific limit on the type of the negative electrode active material, which can be selected according to actual needs. As an example, the negative electrode active material may be one or more selected from natural graphite, artificial graphite, mesophase carbon microspheres (MCMB), hard carbon, soft carbon, silicon-carbon composite, $SiO_m$ (0<m<2, such as m=1), Li—Sn alloy, Li—Sn—O alloy, Sn, SnO, $SnO_2$, lithium titanate $Li_4Ti_5O_{12}$ of a spinel structure, Li—Al alloy, and metallic lithium.

In some embodiments, the negative electrode active material layer may further include a conductive agent and/or a binder. In this application, there is no specific limit on the types of the conductive agent and the binder in the negative electrode active material layer, which can be selected according to actual needs.

As an example, the conductive agent is one or more selected from graphite, superconducting carbon, acetylene black, carbon black, Ketjen black, carbon dots, carbon nanotubes, graphene, and carbon nanofibers.

As an example, the binder is one or more selected from styrene-butadiene rubber (SBR), polyvinylidene fluoride (PVDF), polytetrafluoroethylene (PTFE), polyvinyl butyral (PVB), water-based acrylic resin, and sodium carboxymethyl cellulose (CMC).

In some embodiments, the negative electrode active material layer may further optionally include a thickener, such as sodium carboxymethyl cellulose (CMC).

The negative electrode current collector may be a metal foil or a porous metal plate, and its material may be one or more of copper, nickel, titanium, iron, and respective alloys thereof. The negative electrode current collector is, for example, a copper foil.

The negative electrode plate may be prepared according to conventional methods in the art. For example, a negative electrode active material, a conductive agent, a binder and a thickener are dispersed in a solvent which may be N-methyl pyrrolidone (NMP) or deionized water, to form a uniform negative electrode slurry; the negative electrode slurry is applied on a negative electrode current collector, and the negative electrode plate is obtained after steps of drying, rolling, etc.

In some embodiments, the electrolyte may be a solid electrolyte or an electrolyte solution.

The electrolyte solution includes a solvent and a lithium salt dissolved in the solvent.

The solvent may be a non-aqueous organic solvent, including, for example, one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), methyl formate (MF), methyl acetate (MA), ethyl acetate (EA), propyl acetate (PA), methyl propionate (MP), ethyl propionate (EP), propyl propionate (PP), methyl butyrate (MB) and ethyl butyrate (EB). The solvent preferably includes two or more of the above compounds.

The lithium salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethanesulphonyl)imide), LiTFS (lithium trifluoromethanesulfonate), LiDFOB (lithium difluoroborate), LiBOB (lithium bis(oxalate)borate), LiPO$_2$F$_2$ (lithium difluorophosphate), LiDFOP (lithium difluorobisoxalate phosphate) and LiTFOP (lithium tetrafluorooxalate phosphate), for example, including one or more of LiPF$_6$ (lithium hexafluorophosphate), LiBF$_4$ (lithium tetrafluoroborate), LiBOB (lithium bis(oxalate)borate), LiDFOB (lithium difluoroborate), LiTFSI (lithium bis(trifluoromethanesulphonyl)imide) and LiFSI (lithium bis(fluorosulfonyl)imide).

In some embodiments, the electrolyte may optionally include other additives, such as one or more of vinylene carbonate (VC), vinyl ethylene carbonate (VEC), fluoroethylene carbonate (FEC), difluoroethylene carbonate (DFEC), trifluoromethyl ethylene carbonate (TFPC), succinonitrile (SN), adiponitrile (ADN), glutaronitrile (GLN), hexanetrinitrile (HTN), sulfonate cyclic quaternary ammonium salt, tris(trimethylsilane) phosphate (TMSP), and tris(trimethylsilane) borate (TMSB).

In the lithium-ion secondary battery of the present application, there is no particular restriction on the separator, which may be any well-known porous separator with electrochemical stability and mechanical stability. For example, the separator includes one or more of glass fibers, a non-woven fabric, polyethylene (PE), polypropylene (PP), and polyvinylidene fluoride (PVDF). The separator may be a single-layer or multi-layer film.

The positive electrode plate and the negative electrode plate are laminated in an alternating mode, and the separator is disposed between the positive electrode plate and the negative electrode plate to separate the positive electrode plate and the negative electrode plate to obtain a battery cell. Optionally, a winding step may also be used to obtain a battery cell. The battery cell is placed in a case, and the case is injected with the electrolyte and sealed to obtain a lithium-ion secondary battery.

Battery Module

The fourth aspect of the present application relates to a battery module, including any one or more of the lithium-ion secondary batteries described in the third aspect of the present application.

Further, the number of the lithium-ion secondary batteries included in the battery module may be adjusted according to the application and capacity of the battery module.

Figure 4:
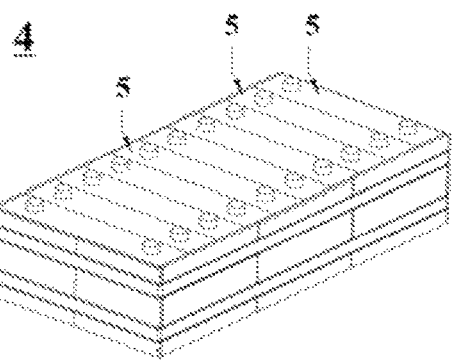
FIG. 4 is a schematic structural diagram of a battery module provided by a specific embodiment of the present application.

In some embodiments, referring to FIG. 4, in the battery module 4, a plurality of lithium-ion secondary batteries 5 may be arranged sequentially in a length direction of the battery module 4. Apparently, they may also be arranged in any other way. Further, the plurality of lithium-ion secondary batteries 5 may be fixed by fasteners.

Optionally, the battery module 4 may further include a case having a receiving space, and the plurality of lithium-ion secondary batteries 5 are included in the receiving space.

Battery Pack

The fifth aspect of the present application relates to a battery pack, including any one or more of the battery modules described in the fourth aspect of the present application. That is, the battery pack includes any one or more of the lithium-ion secondary batteries described in the third aspect of the present application.

The number of the battery modules in the battery pack may be adjusted according to the application and capacity of the battery pack.

Figure 5:
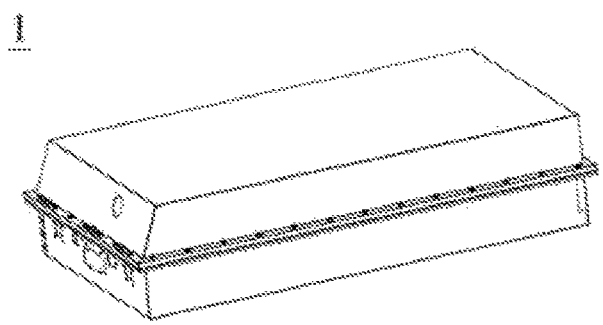
FIG. 5 is a schematic structural diagram of a battery pack provided by a specific embodiment of the present application.
Figure 6:
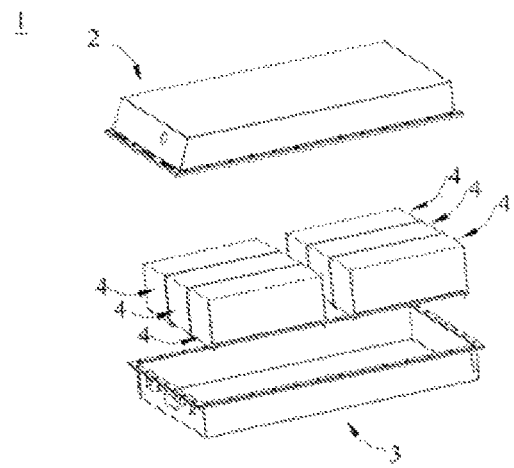
FIG. 6 is an exploded view of FIG. 5.

In some embodiments, referring to FIGS. 5 and 6, the battery pack 1 may include a battery box and a plurality of battery modules 4 disposed in the battery box. The battery box includes an upper box body 2 and a lower box body 3.

The upper box body 2 may cover the lower box body 3 to form a closed space for receiving the battery modules 4. The plurality of battery modules 4 may be arranged in the battery box in any manner.

Apparatus

The sixth aspect of the present application relates to an apparatus, including any one or more of the lithium-ion secondary batteries described in the third aspect of the present application. The lithium-ion secondary battery may be used as a power source for the apparatus.

Preferably, the apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck, etc.), an electric train, a ship, a satellite, an energy storage system, etc.

Figure 7:
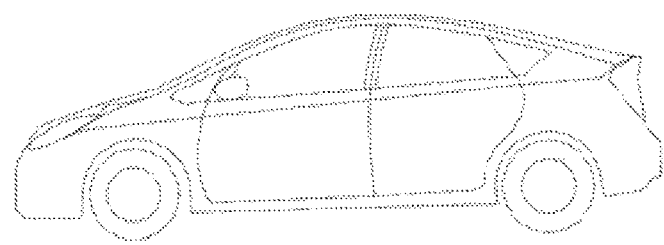
FIG. 7 is a schematic diagram of an embodiment of an apparatus using a lithium-ion secondary battery as a power source.

For example, FIG. 7 shows an apparatus including the lithium-ion secondary battery of the present application. The apparatus is a pure electric vehicle, a hybrid electric vehicle, or a plug-in hybrid electric vehicle. The lithium-ion secondary battery of the present application supplies power to the apparatus.

The above-mentioned battery module, battery pack and apparatus include the lithium-ion secondary battery provided by the present application, and therefore have at least the same advantages as the lithium-ion secondary battery. Details are not described here again.

Some exemplary embodiments of the present application are provided as follows.

Embodiment 1. A positive electrode active material, satisfying a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $0.12 \leq b/c \leq 0.9$, $0.002 \leq b \times c/a^2 \leq 0.23$, $a+b+c=1$, $0 \leq d \leq 0.1$, and $0 \leq y < 0.2$; and an interval particle size distribution curve of the positive electrode active material has a full width at half maximum $D_{FW}$ of from 4 μm to 8 μm.

Embodiment 2. The positive electrode active material according to embodiment 1, wherein the positive electrode active material has a particle size distribution $D_n10$ and a particle size distribution $D_v50$ satisfying: $D_n10 \geq 0.2$ μm, and 2 m $\leq D_v50 \leq 7$ μm;

preferably, $D_n10 \geq 1$ m, and 3 μm $\leq D_v50 \leq 6$ μm.

Embodiment 3. The positive electrode active material according to embodiment 1 or 2, wherein the full width at half maximum $D_{FW}$ of the interval particle size distribution curve of the positive electrode active material and a particle size distribution $D_v99$ and a particle size distribution $D_v10$ of the positive electrode active material satisfy: $0.4 \leq D_Fv/(D_v99-D_v10) \leq 1.2$;

preferably, $0.5 \leq D_Fv/(D_v99-D_v10) \leq 1.0$.

Embodiment 4. The positive electrode active material according to embodiment 3, wherein the particle size distribution $D_v99$ and the particle size distribution $D_v10$ of the positive electrode active material satisfy: 7 μm $\leq D_v99 \leq 15$ μm, and 1 μm $\leq D_v10 \leq 4$ μm;

preferably, 8 m $\leq D_v99 \leq 13$ μm, and 1.5 μm $\leq D_v10 \leq 2.5$ μm.

Embodiment 5. The positive electrode active material according to any one of embodiments 1 to 4, wherein the positive electrode active material comprises dispersed primary particles, and the dispersed primary particles have a number percentage of 50% or more, preferably 70% or more in the positive electrode active material.

Embodiment 6. The positive electrode active material according to embodiment 5, wherein the dispersed primary particles have a monodisperse particle size distribution.

Embodiment 7. The positive electrode active material according to embodiment 5, wherein the positive electrode active material further comprises secondary particles aggregated from a plurality of primary particles;

the secondary particles have a number percentage of from 5% to 50%, preferably from 10% to 30% in the positive electrode active material.

Embodiment 8. The positive electrode active material according to embodiment 7, wherein a ratio of particle sizes of the primary particles in the secondary particles to the secondary particles is from 0.03 to 0.9.

Embodiment 9. The positive electrode active material according to any one of embodiments 1 to 8, wherein the positive electrode active material has a tap density of from 1.6 g/cm³ to 2.6 g/cm³; and/or, the positive electrode active material has a powder compaction density of from 3.0 g/cm³ to 3.6 g/cm³ under a pressure of 3 tons.

Embodiment 10. The positive electrode active material according to any one of embodiments 1 to 9, wherein a surface of the positive electrode active material has a coating comprising an X element oxide, the X element is one or more of a trivalent element and a tetravalent element, and the X element preferably comprises one or more of Zr, B, Ti, Al and Sn.

Embodiment 11. The positive electrode active material according to embodiment 10, wherein the coating has a weight of from 0.01% to 1%, relative to a weight of the positive electrode active material before coating.

Embodiment 12. The positive electrode active material according to any one of embodiments 1 to 11, wherein, in the chemical formula, $0.5 \le a \le 0.7$, and $0 < b \le 0.2$.

Embodiment 13. A positive electrode plate, comprising a positive electrode current collector and a positive electrode active material layer disposed on the positive electrode current collector, the positive electrode active material layer comprising the positive electrode active material according to any one of embodiments 1 to 12.

Embodiment 14. A lithium-ion secondary battery, comprising the positive electrode plate according to embodiment 13.

Embodiment 15. An apparatus, comprising the lithium-ion secondary battery according to embodiment 14, wherein the lithium-ion secondary battery is used as a power source for the apparatus; and preferably, the apparatus comprises a mobile device, an electric vehicle, an electric train, a satellite, a ship, and an energy storage system.

EXAMPLES

The following examples more specifically describe the content disclosed in the present application, and these examples are only used for explanatory description, because various modifications and changes within the scope of the present disclosure are apparent to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of Positive Electrode Active Material
1) Preparation of Positive Electrode Active Material Precursor Nickel sulfate, manganese sulfate and cobalt sulfate were added into deionized water to prepare a mixed solution, wherein a molar ratio of nickel, manganese and cobalt was Ni:Co:Mn=55:15:30; ammonia water (having a concentration of 0.4 mol/L) and sodium hydroxide aqueous solution (having a concentration of 1 mol/L) were introduced into the mixed solution, the pH value of the reaction system was adjusted to 11.3, the reaction system reacted at 40° C. and 600 rpm with stirring, and nitrogen as an inert gas was introduced for protection during the reaction; after the reaction was completed, the solid phase product was washed with deionized water, and then dried at 100° C. to obtain a positive electrode active material precursor $Ni_{0.55}Co_{0.15}Mn_{0.3}(OH)_2$.

2) Preparation of Positive Electrode Active Material

Lithium carbonate $Li_2CO_3$, the positive electrode active material precursor $Ni_{0.55}Co_{0.15}Mn_{0.3}(OH)_2$ and strontium oxide SrO were mixed mechanically. The lithium carbonate and the positive electrode active material precursor were added in an amount such that a ratio of a molar weight of lithium to a total molar weight of nickel, cobalt and manganese was Li:Me=1.08:1, where Me=Ni+Co+Mn; the strontium oxide was added in an amount such that a ratio of a molar weight of strontium in the positive electrode active material to a total molar weight of nickel, cobalt and manganese was Sr:Me=0.002:0.998. In other words, the d in the chemical formula of the positive electrode active material was 0.002.

The mixture was put into a tube furnace, heated to 940° C. at a program of 5° C./min in an air atmosphere, sintered for 13 h, then cooled to room temperature with the furnace, and crushed and graded to obtain an active material precursor with an average particle size $D_v50$ of 4.5 µm.

The active material precursor was coated with aluminum oxide $Al_2O_3$, then tempered at a temperature of 550° C., and sieved to obtain an $Al_2O_3$-coated positive electrode active material CA1. The positive electrode active material (without coating) had a chemical formula of $Li(Ni_{0.55}Co_{0.15}Mn_{0.3})_{0.998}Sr_{0.002}O_2$. The coating had a weight of 0.02% relative to a weight of the positive electrode active material before coating step.

Figure 2:
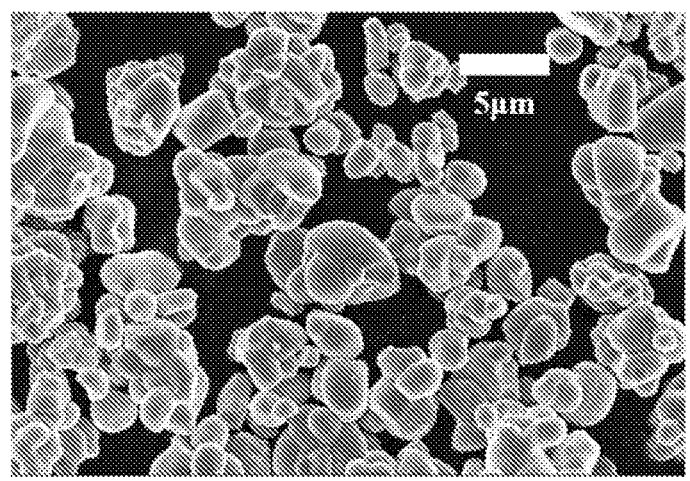
FIG. 2 is a scanning electron microscope (SEM) image of the positive electrode active material provided in Example 1.
Figure 3:
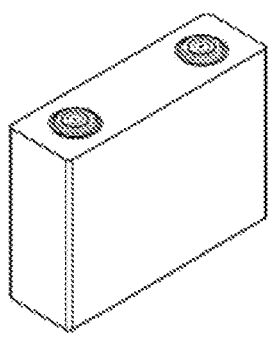
FIG. 3 is a schematic structural diagram of a lithium-ion secondary battery provided by a specific embodiment of the present application.

The particle morphology of the positive electrode active material CA1 was tested with a scanning electron microscope (SEM), and the test results were shown in FIG. 2, which showed a large number of dispersed primary particles with uniform morphology, compact structure and uniform distribution, and few agglomerated secondary particles. The ratio of particle sizes of the primary particles in the secondary particles to the secondary particles was from 0.15 to 0.21. In the positive electrode active material CA1, the dispersed primary particles had a number percentage of 70%, and the secondary particles had a number percentage of 30%. The interval particle size distribution curve of the positive electrode active material CA1 was shown in FIG. 1, where the full width at half maximum $D_{FW}$ was 6.2 µm.

Preparation of Positive Electrode Plate

The positive electrode active material prepared above and a conductive carbon black SP and PVDF as a binder were dispersed in solvent NMP at a weight ratio of 181:1 and mixed uniformly to obtain a positive electrode slurry; the positive electrode slurry was uniformly applied on an aluminum foil as a positive electrode current collector, and a positive electrode plate was obtained after drying and cold pressing.

Preparation of Negative Electrode Plate

A metal lithium plate was used.

Preparation of Electrolyte

Ethylene carbonate (EC), ethyl methyl carbonate (EMC) and diethyl carbonate (DEC) were mixed uniformly according to a mass ratio of 30:30:40 to obtain an organic solvent. $LiPF_6$ was dissolved in the solvent and mixed uniformly to obtain an electrolyte. The concentration of $LiPF_6$ in the electrolyte was 1 mol/L.

Preparation of a Button Battery

The positive electrode plate, a PP/PE/PP composite separator and the negative electrode plate were laminated in order, and the above-mentioned electrolyte was added to complete the preparation of a button battery.

Example 2

The differences from Example 1 were as follows in preparation steps of a positive electrode active material:
1) Preparation of Positive Electrode Active Material Precursor A molar ratio of nickel, manganese and cobalt was Ni:Co:Mn=55:12:33, and the positive electrode active material precursor was $Ni_{0.55}Co_{0.12}Mn_{0.33}(OH)_2$;
2) Preparation of Positive Electrode Active Material Strontium oxide as M source was added in an amount such that a ratio of a molar weight of strontium in the active material particles to a total molar weight of nickel, cobalt and manganese was Sr:Me=0.001:0.999. In other words, the d in the chemical formula of the positive electrode active material was 0.001;

The sintering was carried at 945° C. for 14 h;

Titanium oxide $TiO_2$ was used for coating;

A $TiO_2$-coated positive electrode active material CA2 was obtained. The chemical formula of the positive electrode active material (without coating) satisfied $Li(Ni_{0.55}Co_{0.12}Mn_{0.33})_{0.999}Sr_{0.001}O_2$.

By SEM test, the positive electrode active material CA2 included dispersed primary particles and a small amount of secondary particles. The ratio of particle sizes of the primary particles in the secondary particles to the secondary particles was from 0.1 to 0.19. In the positive electrode active material CA2, the dispersed primary particles had a number percentage of 65%, and the secondary particles had a number percentage of 35%. The interval particle size distribution curve of the positive electrode active material CA2 had a full width at half maximum $D_{FW}$ of 6.5 μm.

Example 3

The differences from Example 1 were as follows in preparation steps of a positive electrode active material:
1) Preparation of a Positive Electrode Active Material Precursor A molar ratio of nickel, manganese and cobalt was Ni:Co:Mn=55:5:40, and the positive electrode active material precursor was $Ni_{0.55}Co_{0.05}Mn_{0.4}(OH)_2$;

The pH value of the reaction system was adjusted to 11.7;
2) Preparation of a Positive Electrode Active Material The sintering was carried at 930° C. for 14.5 h;

No coating step was carried out;

A positive electrode active material CA3 was obtained, and its chemical formula satisfied $Li(Ni_{0.55}Co_{0.05}Mn_{0.40})_{0.998}Sr_{0.002}O_2$.

By SEM test, the positive electrode active material CA3 included dispersed primary particles and a small amount of secondary particles. The ratio of particle sizes of the primary particles in the secondary particles to the secondary particles was from 0.18 to 0.28. In the positive electrode active material CA3, the dispersed primary particles had a number percentage of 82%, and the secondary particles had a number percentage of 18%. The interval particle size distribution curve of the positive electrode active material CA3 had a full width at half maximum $D_{FW}$ of 5.3 μm.

Example 4

The differences from Example 1 were as follows in preparation steps of a positive electrode active material:
1) Preparation of a Positive Electrode Active Material Precursor A molar ratio of nickel, manganese and cobalt was Ni:Co:Mn=55:12:33, and the positive electrode active material precursor was $Ni_{0.55}Co_{0.12}Mn_{0.33}(OH)_2$;
2) Preparation of a Positive Electrode Active Material The M source was magnesium oxide MgO. The magnesium oxide was added in an amount such that a ratio of a molar weight of magnesium in the active material particles to a total molar weight of nickel, cobalt and manganese was Mg:Me=0.002:0.998. In other words, the d in the chemical formula of the positive electrode active material was 0.002;

The positive electrode active material was coated with magnesium oxide MgO.

A MgO-coated positive electrode active material CA4 was obtained. The chemical formula of the positive electrode active material (without coating) satisfied $Li(Ni_{0.55}Co_{0.12}Mn_{0.33})_{0.998}Mg_{0.002}O_2$.

By SEM test, the positive electrode active material CA4 included dispersed primary particles and a small amount of secondary particles. The ratio of particle sizes of the primary particles in the secondary particles to the secondary particles was from 0.14 to 0.20. In the positive electrode active material, the dispersed primary particles had a number percentage of 90%, and the secondary particles had a number percentage of 10%. The interval particle size distribution curve of the positive electrode active material CA4 had a full width at half maximum $D_{FW}$ of 5.7 μm.

Example 5

The differences from Example 1 were as follows in preparation steps of a positive electrode active material:
1) Preparation of Positive Electrode Active Material Precursor A molar ratio of nickel, manganese and cobalt was Ni:Co:Mn=55:9:36, and the positive electrode active material precursor was $Ni_{0.55}Co_{0.09}Mn_{0.36}(OH)_2$;

The pH value of the reaction system was adjusted to 11.5;
2) Preparation of Positive Electrode Active Material The M source was zirconium oxide $ZrO_2$. The zirconium oxide was added in an amount such that a ratio of a molar weight of zirconium in the active material particles to a total molar weight of nickel, cobalt and manganese was Zr:Me=0.002:0.998. In other words, the d in the chemical formula of the positive electrode active material was 0.002;

The sintering was carried at 950° C. for 14 h;

The tempering was carried out at 600° C.;

An $Al_2O_3$-coated positive electrode active material CA5 was obtained; the chemical formula of the positive electrode active material (without coating) satisfied $Li(Ni_{0.55}Co_{0.09}Mn_{0.36})_{0.998}Zr_{0.002}O_2$.

By SEM test, the positive electrode active material CA5 included dispersed primary particles and a small amount of secondary particles. The ratio of particle sizes of the primary particles in the secondary particles to the secondary particles was from 0.03 to 0.12. In the positive electrode active material, the dispersed primary particles had a number percentage of 72%, and the secondary particles had a number percentage of 28%. The interval particle size distribution curve of the positive electrode active material CA5 had a full width at half maximum $D_{FW}$ of 7.4 μm.

Example 6

The differences from Example 1 were as follows preparation steps of a positive electrode active material:
1) Preparation of a Positive Electrode Active Material Precursor
A molar ratio of nickel, manganese and cobalt was Ni:Co:Mn=50:9:41, and the positive electrode active material precursor was $Ni_{0.50}Co_{0.09}Mn_{0.41}(OH)_2$;
The pH value of the reaction system was adjusted to 11.5;
2) Preparation of a Positive Electrode Active Material
The M source was zirconium oxide $ZrO_2$. The zirconium oxide was added in an amount such that a ratio of a molar weight of zirconium in the active material particles to a total molar weight of nickel, cobalt and manganese was Zr:Me=0.002:0.998. In other words, the d in the molecular formula of the active material particles was 0.002;
The sintering was carried at 980° C. for 14 h;
The tempering was carried out at 600° C.;
An $Al_2O_3$-coated positive electrode active material CA6 was obtained; the chemical formula of the positive electrode active material (without coating) satisfied $Li(Ni_{0.50}Co_{0.09}Mn_{0.41})_{0.998}Zr_{0.002}O_2$.
By SEM test, the positive electrode active material CA6 included dispersed primary particles and a small amount of secondary particles. The ratio of particle sizes of the primary particles in the secondary particles to the secondary particles was 0.65 to 0.83. In the positive electrode active material, the dispersed primary particles had a number percentage of 80%, and the secondary particles had a number percentage of 20%. The interval particle size distribution curve of the positive electrode active material CA6 had a full width at half maximum $D_{FW}$ of 5.5 μm.

Example 7

The differences from Example 1 were as follows in preparation steps of a positive electrode active material:
1) Preparation of a Positive Electrode Active Material Precursor
A molar ratio of nickel, manganese and cobalt was Ni:Co:Mn=70:5:25, and the positive electrode active material precursor was $Ni_{0.70}Co_{0.05}Mn_{0.25}(OH)_2$;
The pH value of the reaction system was adjusted to 10.8;
2) Preparation of a Positive Electrode Active Material
The sintering was carried at 920° C. for 20 h;
The tempering was carried out at 450° C.;
An $Al_2O_3$-coated positive electrode active material CA7 was obtained; the chemical formula of the positive electrode active material (without coating) satisfied $Li(Ni_{0.70}Co_{0.05}Mn_{0.25})_{0.998}Sr_{0.002}O_2$.
By SEM test, the positive electrode active material CA7 included dispersed primary particles and a small amount of secondary particles. The ratio of particle sizes of the primary particles in the secondary particles to the secondary particles was 0.42 to 0.60. In the positive electrode active material, the dispersed primary particles had a number percentage of 70%, and the secondary particles had a number percentage of 30%. The interval particle size distribution curve of the positive electrode active material CA7 had a full width at half maximum $D_{FW}$ of 5.3 μm.

Example 8

The differences from Example 1 were as follows in preparation steps of a positive electrode active material:
2) Preparation of a Positive Electrode Active Material
Doping was not carried out. In other words, no M source material was added;
The precursor of the active material particles was not coated;
The sintering temperature was 850° C.;
A positive electrode active material CA8 was obtained, and its chemical formula satisfied $Li(Ni_{0.55}Co_{0.15}Mn_{0.3})O_2$.
By SEM test, the positive electrode active material CA8 had a lot of secondary particles. The ratio of particle sizes of the primary particles in the secondary particles to the secondary particles was 0.03 to 0.08. In the positive electrode active material, the dispersed primary particles had a number percentage of 15%, and the secondary particles had a number percentage of 85%. The interval particle size distribution curve of the positive electrode active material CA8 had a full width at half maximum $D_{FW}$ of 4.1 μm.

Comparative Example 1

The differences from Example 1 were as follows in preparation steps of a positive electrode active material:
1) Preparation of a Positive Electrode Active Material Precursor
A molar ratio of nickel, manganese and cobalt was Ni:Co:Mn=55:5:40, and the positive electrode active material precursor was $Ni_{0.55}Co_{0.05}Mn_{0.4}(OH)_2$;
The pH value of the reaction system was adjusted to 11.2;
The solid phase product was dried at 90° C. after washing;
2) Preparation of a Positive Electrode Active Material
The sintering was carried at 960° C. for 13 h;
Doping was not carried out, and titanium oxide $TiO_2$ was used for coating;
The tempering was carried out at 600° C.;
A $TiO_2$-coated positive electrode active material D1 was obtained; the chemical formula of the positive electrode active material (without coating) satisfied $LiNi_{0.55}Co_{0.05}Mn_{0.40}O_2$.
The particle morphology of the positive electrode active material D1 was tested by SEM, showing that particles were severely agglomerated. The ratio of particle sizes of the primary particles in the secondary particles to the secondary particles was 0.005 to 0.01. In the positive electrode active material, the dispersed primary particles had a number percentage of 28%, and the secondary particles had a number percentage of 72%. The interval particle size distribution curve of the positive electrode active material D1 had a full width at half maximum $D_{FW}$ of 2.4 μm.

Comparative Example 2

The differences from Example 1 were as follows in preparation steps of a positive electrode active material:
2) Preparation of a Positive Electrode Active Material
The sintering was carried at 800° C. for 10 h;
An $Al_2O_3$-coated positive electrode active material D2 was obtained; the chemical formula of the positive electrode active material (without coating) satisfied $Li(Ni_{0.55}Co_{0.15}Mn_{0.3})_{0.998}Sr_{0.002}O_2$.

The particle morphology of the positive electrode active material D2 was tested by SEM, showing agglomerated secondary particles with a relatively wide particle size distribution and basically no dispersed primary particles. The ratio of particle sizes of the primary particles in the secondary particles to the secondary particles was 0.003 to 0.006. The interval particle size distribution curve of the positive electrode active material D2 had a full width at half maximum $D_{FW}$ of 8.3 μm.

Test Section (1) Test on Compaction Density of Positive Electrode Active Material Powder 2.0 g of positive electrode active material powder was weighed and placed in a mold of a UTM7305 electronic pressure tester, the pressure was adjusted to 3 tons, and after the pressure was held for 30 s, a height value of the positive electrode active material powder block was read. A compaction density P.D of the positive electrode active material under a pressure of 3 tons was calculated through the following formula:

$$P.D = \omega/(\alpha \times h)$$

In the formula, ω is a mass of the positive electrode active material powder, in g; α is a bottom area of the mold, in cm²; h is the height value of the positive electrode active material powder, in cm.

(2) Test on Capacity Performance of the Positive Electrode Active Material

At 25° C., the button battery was charged to 4.3 V at a constant current rate of 0.33C, then charged at a constant voltage until the current was less than or equal to 0.05C, stood for 5 minutes, and discharged to 2.8 V at the constant current rate of 0.33C. The discharge capacity at this time was an initial capacity per gram.

(3) Test on 45° C. Cycle Performance of the Lithium-Ion Battery

At 45° C., the button battery was charged to 4.3 V at a constant current rate of 1C, then charged at a constant voltage until the current was less than or equal to 0.05C, stood for 5 minutes, and discharged to 2.8 V at the constant current rate of (C. This was a charging and discharging cycle. The discharge capacity at this time was recorded as a discharge capacity of the first cycle. The button battery was subjected to 400 cycles of charging and discharging test according to the above method, and the discharge capacity of each cycle was recorded.

The capacity retention rate (% o) of the button battery at 45° C. after 400 cycles of 1C/1C=the discharge capacity of the $400^{th}$ cycle/the discharge capacity of the $1^{st}$ cycle×100%.

(4) Test on Power Performance of the Lithium-Ion Battery

At 25° C., the button battery was charged to 4.3 V at a constant current rate of 1C, then charged at a constant voltage until the current was less than or equal to 0.05C, adjusted to a 500% state of charge (SOC), and discharged at a rate of 4C for 30 s. The voltage drop before and after the discharge was recorded. The ratio of the voltage drop before and after the discharge to the discharge current was a direct current resistance (DCR) of the battery.

The test results of Examples 1 to 8 and Comparative Examples 1 and 2 were shown in Table 2.

TABLE 1

| | $D_n10$ (μm) | $D_v10$ (μm) | $D_v50$ (μm) | $D_v99$ (μm) | Full width at half maximum $D_{FW}$ (μm) | $D_{FW}/(D_v99 - D_v10)$ |
|---|---|---|---|---|---|---|
| Example 1 | 0.8 | 2.2 | 4.5 | 10.5 | 6.2 | 0.75 |
| Example 2 | 1.4 | 2.1 | 3.8 | 8.8 | 6.5 | 0.97 |
| Example 3 | 1.1 | 1.9 | 3.9 | 12.1 | 5.3 | 0.52 |
| Example 4 | 1.9 | 2.8 | 4.7 | 10.5 | 5.7 | 0.74 |
| Example 5 | 1.4 | 2.2 | 4.4 | 13.1 | 7.4 | 0.68 |
| Example 6 | 1.0 | 2.3 | 5.5 | 12.4 | 5.5 | 0.65 |
| Example 7 | 1.2 | 1.9 | 3.0 | 10.7 | 5.3 | 0.52 |
| Example 8 | 2.4 | 1.5 | 4.2 | 11.5 | 4.1 | 0.41 |
| Comparative Example 1 | 3.4 | 4 | 5.5 | 9.6 | 2.4 | 0.43 |
| Comparative Example 2 | 1.4 | 2.5 | 6.1 | 15.8 | 8.3 | 0.62 |

TABLE 2

| | Compaction density under a pressure of 3 tons (g/cm³) | Capacity retention rate at 45° C. after 400 cycles of 1 C./1 C. (%) | Power performance/ DCR (mΩ) | Initial capacity per gram (mAh/g) |
|---|---|---|---|---|
| Example 1 | 3.15 | 95 | 31.25 | 173 |
| Example 2 | 3.18 | 94 | 28.06 | 173 |
| Example 3 | 3.20 | 96 | 27.88 | 171 |
| Example 4 | 3.21 | 97 | 33.23 | 172 |
| Example 5 | 3.19 | 93 | 31.56 | 170 |
| Example 6 | 3.20 | 90 | 38.42 | 172 |
| Example 7 | 3.13 | 87 | 33.42 | 194 |
| Example 8 | 3.12 | 86 | 25.42 | 174 |
| Comparative Example 1 | 3.05 | 83 | 24.63 | 175 |
| Comparative Example 2 | 3.30 | 78 | 40.35 | 165 |

Example 2

The positive electrode active material prepared in Comparative Example 1 had a relatively low cobalt content, the severely agglomerated secondary particles in the material accounted for a relatively high proportion, the full width at half maximum $D_{FW}$ of the interval particle size distribution curve was too small, and the particle size distribution was too centralized; although the capacity per gram was relatively high and the DCR was relatively good, the powder compaction density of the positive electrode active material was low, and the capacity retention rate after high temperature cycles was relatively low, which were not conducive to improving the volume energy density, weight energy density and high temperature cycle performance of the battery. In Comparative Example 2, the full width at half maximum $D_{FW}$ of the interval particle distribution curve of the positive electrode active material was too large, thus there was fine powder with too low particle size and large particles with too high particle size in the material, which can increase the compaction density of the positive electrode active material to a certain extent, but the positive electrode active material had low capacity per gram, large DCR and poor high temperature cycle performance.

In Examples 1-8, the cobalt content in the positive electrode active materials was relatively low, and meanwhile the proportion of elements in the chemical formula satisfied a predetermined relationship. This ensures that the positive electrode active material had relatively high structural stability; the full width at half maximum $D_{FW}$ of the interval particle size distribution curve of the positive electrode active material within a predetermined range ensures that the positive electrode plate using the positive electrode active material had a relatively high compaction density; meanwhile, the positive electrode active material had relatively high lithium ion and electron transport performance. Therefore, the lithium-ion secondary batteries using the positive electrode active materials had good cycle performance and power performance, and relatively high energy density.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A positive electrode active material, satisfying a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $a \leq 0.5$, $0 < b < 0.15$, $0.12 < b/c < 0.75$, $0.002 \leq b \times c/a^2 < (1.2 \times 3.3 \div 5.5^2)$, $a+b+c=1$, $0 \leq d \leq 0.1$, and $0 \leq y < 0.2$; and
   an interval particle size distribution curve of the positive electrode active material has a full width at half maximum $D_{FW}$ of from 4 μm to 8 μm; and the positive electrode active material further comprises secondary particles aggregated from a plurality of primary particles, and the secondary particles have a number percentage of from 5% to 50% in the positive electrode active material.

2. The positive electrode active material according to claim 1, wherein $0.5 \leq a \leq 0.7$, $0.05 \leq b \leq 0.12$, $0.12 < b/c < 0.75$, and $(0.5 \times 2.5 \geq 7^2) \leq b \times c/a^2 \leq (3.5 \div 5.5^2)$.

3. The positive electrode active material according to claim 1, wherein the positive electrode active material comprises one or more of $LiNi_{0.55}Co_{0.05}Mn_{0.4}O_2$, $LiNi_{0.55}Co_{0.1}Mn_{0.35}O_2$, $LiNi_{0.55}Co_{0.09}Mn_{0.36}O_2$, $LiNi_{0.65}Co_{0.05}Mn_{0.3}O_2$, $LiNi_{0.65}Co_{0.09}Mn_{0.26}O_2$, $LiNi_{0.65}Co_{0.12}Mn_{0.23}O_2$, $LiNi_{0.7}Co_{0.05}Mn_{0.25}O_2$ and a positive electrode active material obtained after doping the above materials with the M element at transition metal site and/or doping the above materials with the A element at oxygen site.

4. The positive electrode active material according to claim 1, wherein the positive electrode active material has a particle size distribution $D_n10$ and a particle size distribution $D_v50$ satisfying: $D_n10 \geq 0.2$ μm, and $2$ μm $\leq D_v50 \leq 7$ μm.

5. The positive electrode active material according to claim 1, wherein the full width at half maximum $D_{FW}$ of the interval particle size distribution curve of the positive electrode active material and a particle size distribution $D_v99$ and a particle size distribution $D_v10$ of the positive electrode active material satisfy: $0.4 \leq D_{FW}/(D_v99-D_v10) \leq 1.2$.

6. The positive electrode active material according to claim 1, wherein the particle size distribution $D_v99$ and the particle size distribution $D_v10$ of the positive electrode active material satisfy: $7$ μm $\leq D_v99 \leq 15$ μm, and $1$ μm $\leq D_v10 \leq 4$ μm.

7. The positive electrode active material according to claim 1, wherein the positive electrode active material comprises monodispersed primary particles, and the monodispersed primary particles have a number percentage of 50% or more in the positive electrode active material.

8. The positive electrode active material according to claim 1, wherein the secondary particles have a number percentage of from 10% to 30% in the positive electrode active material.

9. The positive electrode active material according to claim 1, wherein a ratio of particle sizes of the primary particles in the secondary particles to the secondary particles is from 0.03 to 0.9.

10. The positive electrode active material according to claim 1, wherein the positive electrode active material has a tap density of from 1.6 g/cm$^3$ to 2.6 g/cm$^3$; and/or,
    the positive electrode active material has a powder compaction density of from 3.0 g/cm$^3$ to 3.6 g/cm$^3$ under a pressure of 3 tons.

11. The positive electrode active material according to claim 1, wherein a surface of the positive electrode active material has a coating comprising an X element oxide, the X element is one or more of a trivalent element and a tetravalent element.

12. The positive electrode active material according to claim 11, wherein the X element preferably comprises one or more of Zr, B, Ti, Al and Sn.

13. The positive electrode active material according to claim 11, wherein the coating has a weight of from 0.01% to 1%, relative to a weight of the positive electrode active material before coating.

14. The positive electrode active material according to claim 1, wherein the positive electrode active material has a specific surface area of from 0.1 m$^2$/g to 1.2 m$^2$/g.

15. A positive electrode plate, comprising a positive electrode current collector and a positive electrode active material layer disposed on the positive electrode current collector, the positive electrode active material layer comprising the positive electrode active material according to claim 1.

16. A lithium-ion secondary battery, comprising the positive electrode plate according to claim 15.

17. An electric vehicle, comprising the lithium-ion secondary battery according to claim 16.

18. A method for preparing a positive electrode active material, comprising:
    mixing a positive electrode active material precursor, a lithium source, and an optional M source and/or A source and sintering to obtain a sintered product;
    crushing and sieving the sintered product to obtain an active material precursor;
    optionally, coating the active material precursor with an X element oxide, the X element is one or more of a trivalent element and a tetravalent element;
    tempering and sieving the active material precursor to obtain the positive electrode active material;
    wherein the positive electrode active material satisfies a chemical formula $Li_{1+x}(Ni_aCo_bMn_c)_{1-d}M_dO_{2-y}A_y$, wherein M is one or more selected from Zr, Sr, B, Ti, Mg, Sn and Al, A is one or more selected from S, N, F, Cl, Br and I, $-0.01 \leq x \leq 0.2$, $a \geq 0.5$, $0 < b < 0.15$, $0.12 < b/c < 0.75$, $0.002 \leq b \times c/a^2 < (1.2 \times 3.3 \div 5.5^2)$, $a+b+c=1$, $0 \leq d \leq 0.1$, and $0 \leq y < 0.2$; and
    an interval particle size distribution curve of the positive electrode active material has a full width at half maximum $D_{FW}$ of from 4 μm to 8 μm; and the positive electrode active material further comprises secondary particles aggregated from a plurality of primary particles, and the secondary particles have a number percentage of from 5% to 50% in the positive electrode active material.

19. The method according to claim 18, wherein the sintering temperature is from 820° C. to 1000° C.; and/or, the tempering temperature is from 400° C. to 800° C.

* * * * *